Figure 1:
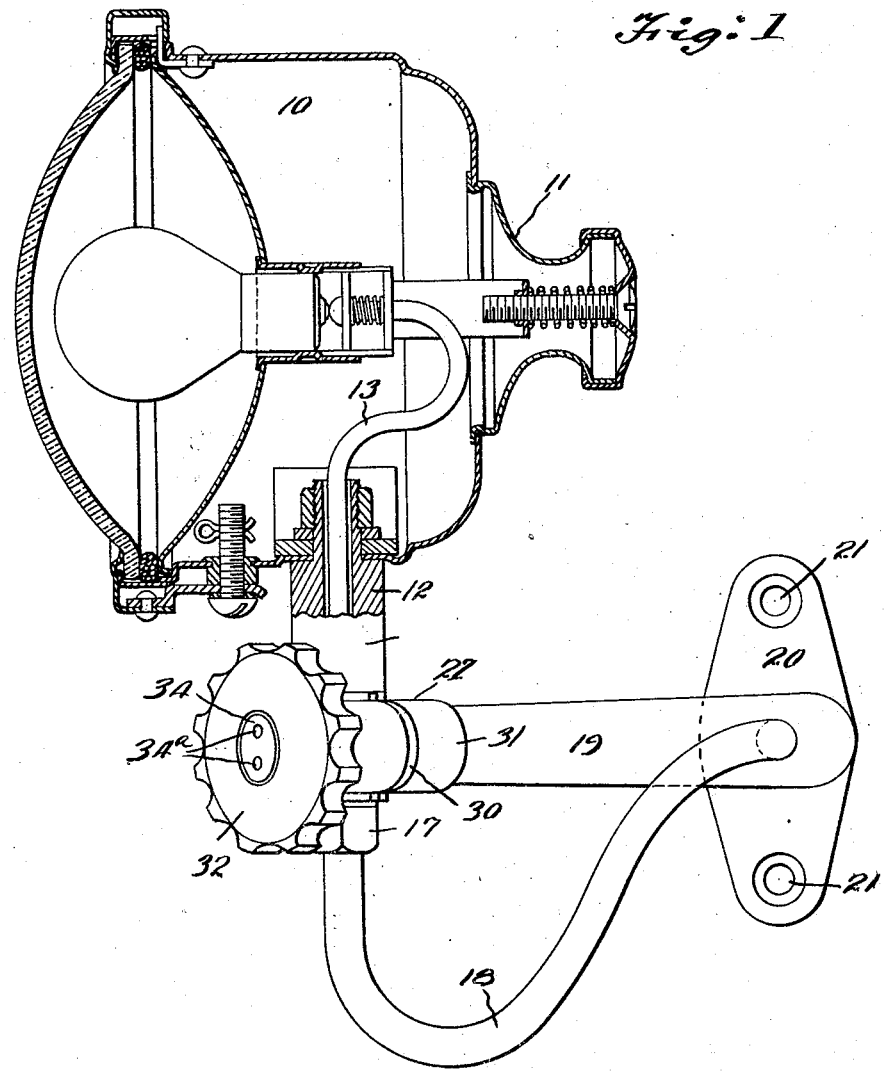

May 4, 1926.

C. A. MICHEL 1,583,412

SPOTLIGHT MOUNTING

Filed May 7, 1923

2 Sheets-Sheet 1

Inventor
C. A. Michel
By
Hull Brock & West
Att'ys

May 4, 1926.
C. A. MICHEL
1,583,412
SPOTLIGHT MOUNTING
Filed May 7, 1923
2 Sheets-Sheet 2
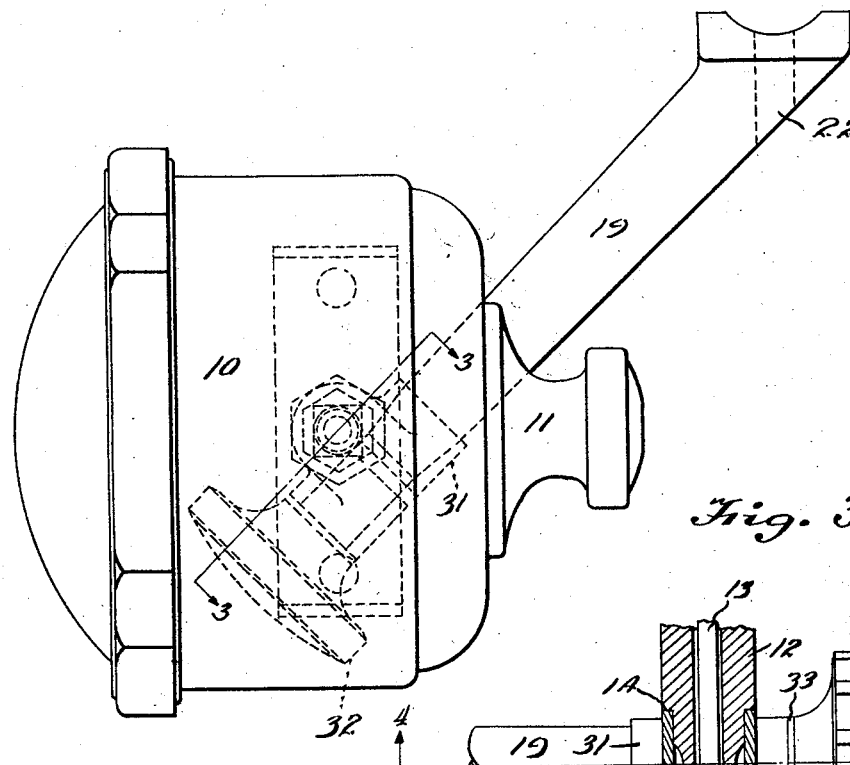
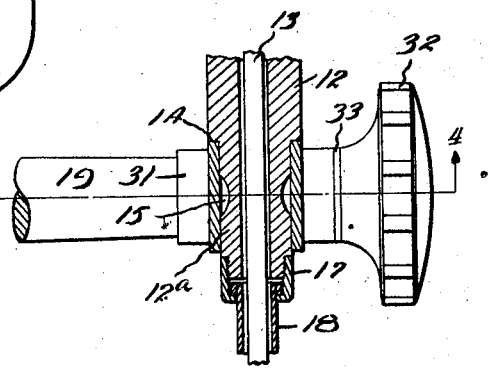
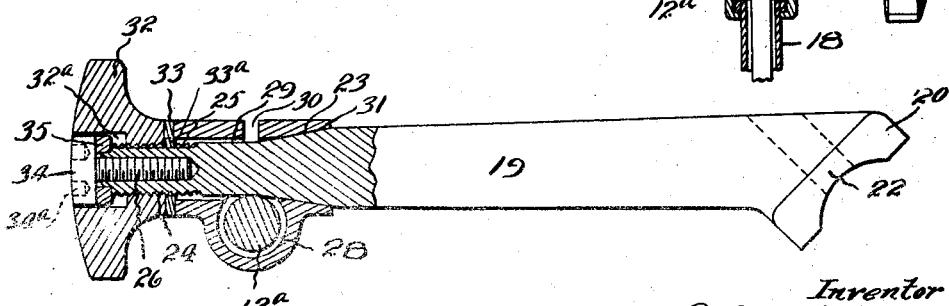

Patented May 4, 1926.

1,583,412

UNITED STATES PATENT OFFICE.

CLARENCE A. MICHEL, OF CLEVELAND, OHIO, ASSIGNOR TO THE GUIDE MOTOR LAMP MANUFACTURING COMPANY, OF CLEVELAND, OHIO, A CORPORATION OF OHIO.

SPOTLIGHT MOUNTING.

Application filed May 7, 1923. Serial No. 637,141.

*To all whom it may concern:*

Be it known that I, CLARENCE A. MICHEL, a citizen of the United States, residing at Cleveland, in the county of Cuyahoga and State of Ohio, have invented a certain new and useful Improvement in Spotlight Mountings, of which the following is a full, clear, and exact description, reference being had to the accompanying drawings.

This invention relates generally to spot lights for automobiles and more particularly to a mounting for the same, the object being to provide an exceedingly simple and highly efficient construction of mounting in which the adjustments can be quickly and easily made with one hand and in which the parts can be securely locked after the desired adjustment has been obtained.

Another object of the invention is to provide a mounting in which vertical and horizontal adjustments can be quickly and easily obtained.

With these various objects in view the invention consists in the novel features of construction and in the manner of combining or arranging the same, all of which will be fully described hereinafter and set forth in the appended claims.

In the drawings forming part of this specification, Fig. 1 is a sectional elevation of a spot light provided with my improved mounting; Fig. 2 is a top plan view of the same; Fig. 3 is a section elevation on the line 3—3 of Fig. 2 and Fig. 4 is a detail sectional view on the line 4—4 of Fig. 3.

In carrying out my invention I employ a spot light 10 which may be of any desired construction but preferably one having a rearwardly extending portion 11 which provides a suitable handle for manipulating the spot light and also provides ample space for the focussing mechanism for the incandescent lamp but these features do not constitute any part of my present invention. The spot light is provided with a tubular stem 12 which is rigidly connected to the bottom of the casing and through which the conductor wires 13 pass. The lower end of the tubular stem 12 is reduced as shown at 12ª providing an annular shoulder 14 and the reduced portion 12ª has the horizontal annular groove 15 cut therein, as most clearly shown in Fig. 3 and the extreme lower end of the tubular stem is threaded as shown at 16 to receive the threaded cap 17 which secures the flexible covering 18 for the conductor wire 13.

For the purpose of supporting the spot light I provide a bracket arm 19 having a base or flange 20 provided with openings 21 for attachment to the windshield frame of the automobile and the flange or base 20 is arranged at the proper angle with reference to the longitudinal center of the bracket arm 19 in order to place the spot light in the proper position with reference to the vehicle; and the bracket arm and base are apertured as shown at 22 for the purpose of projecting the flexible covering 18 and the conductor wires therein through the bracket into the interior of the car. The outer end of the bracket arm 19 is tapered for a suitable distance as indicated at 23 and externally threaded at its outer end as indicated at 24 and the threaded end is also longitudinally grooved as indicated at 25 and is furthermore centrally bored and threaded as indicated at 26. Fitting upon the outer end of the bracket arm 19 is the stem and bracket receiving member 27, said member being bored vertically as shown at 28 to receive the reduced end 12ª of the tubular stem and horizontally as shown at 29 to receive the reduced end of the bracket arm 19 and this member is split or divided as indicated at 30 and the inner portion thereof is counterbored as indicated at 31 in order to fit upon the tapered or cone portion 23 of the bracket arm 19 and a clamping nut in the form of a hand wheel 32 is screwed upon the threaded end of the bracket arm for the purpose of drawing together the divided portions of the member 27, the reduced end of the bracket arm fitting into the annular groove 15 on the stem of the spot light and the counterbored portion 31 binding tightly upon the tapered portion 23 thereby securely fastening all the parts together and holding them against possible dislocation after they have once been adjusted and secured. In practice I prefer to interpose between the member 27 and the clamping nut 32 a washer 33 having an inwardly extending tongue 33ª which fits in the longitudinal groove 25 and to prevent the clamping nut being inadvertently unscrewed and disconnected from the end of the bracket arm I prefer to screw a headed bolt 34 into the threaded recess 26 at the end of the bracket arm and the head of the bolt, the clamping nut 32 being formed with a recessed portion 32ª which permits the clamping nut to move outwardly a limited distance sufficient to completely release the clamp so that adjustments can be readily made and then by tightening up upon the clamping nut the clamp can be tightened once more for the purpose of holding the several elements in their readjusted positions. The head of the bolt 34 is preferably formed with spaced recesses 34ª into which a proper key or wrench can be inserted for the purpose of unscrewing the bolt whenever it is desired to disconnect the parts.

It will be understood that when the stem is inserted into the receiving member 27 the annular shoulder 14 thereof will contact with and rest upon the said member thereby determining the position of the spot light with reference to the bracket arm. The spot light can be readily turned horizontally on the tubular stem 12 of the pivot and can also be rocked vertically by turning the stem and receiving member 27 upon the bracket arm. The receiving member 27 being both counterbored and split, and fitting upon a correspondingly tapered portion of the bracket arm; adjustments can be quickly and easily made by simply loosening and retightening the clamping nut and by virtue of these special details one hand will be sufficient to perform all the operations necessary to accomplish any of the desired adjustments. The stem of the spot light having the annular groove in which the reduced portion of the bracket arm fits prevents the disassociation of the spot light from the bracket arm after the parts have once been assembled.

It will thus be seen that I provide an exceedingly simple but highly efficient and easily adjusted form of spot light mounting capable of carrying out all of the various functions and objects hereinbefore recited.

Having thus described my invention, what I claim is:

1. The combination of a bracket arm having a tapering outer end, of a split clamping member having a tapered bore adapted to fit upon the tapered end of said bracket arm, a nut screwed upon the end of said bracket arm and adapted to contact with said clamping member, and means for limiting the outward movement of said nut and a spot light stem extending through a bore in the clamping member at right angles to the bracket arm, said stem having an annular groove into which the tapered portion of the bracket arm fits, said spot-light stem having an annular shoulder adapted to rest upon the clamping member.

2. The combination with a bracket arm having a tapering portion and a threaded end provided with a threaded recess, of a spot light having a stem and a clamping member bored to receive said stem and said bracket arm including the tapered portion, said clamping member being split, transverse to the clamping arm, a clamping nut screwed upon the end of the bracket arm and adapted to contract the clamping member, and a headed bolt screwed into the end of the bracket arm, said clamping nut having a recess in which the head of bolt is located, the clamping nut having a limited movement upon the end of the bracket arm, the head of bolt serving to limit the outward movement of said nut.

In testimony whereof, I hereunto affix my signature.

CLARENCE A. MICHEL.